UNITED STATES PATENT OFFICE.

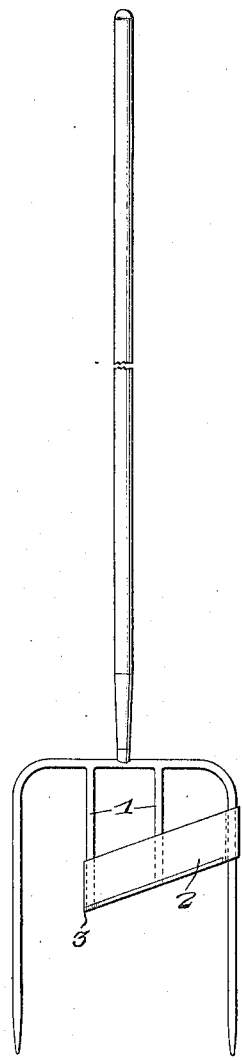

JAMES M. JACK, OF WINFIELD, KANSAS.

PITCHFORK.

1,302,375. Specification of Letters Patent. Patented Apr. 29, 1919.

Application filed March 8, 1918. Serial No. 221,197.

*To all whom it may concern:*

Be it known that I, JAMES M. JACK, a citizen of the United States, residing at Winfield, in the county of Cowley and State of Kansas, have invented new and useful Improvements in Pitchforks, of which the following is a specification.

This invention relates to new and useful improvements in pitch forks and the principal object of the invention is to provide the fork with a knife whereby the material may be cut before being lifted or moved by the fork.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

The figure is a view showing a fork made in accordance with my invention.

As shown in this view the fork is made as usual but the two central tines 1 are cut off or formed of considerably less length than the two outer tines and the knife or cutting member 2 is secured to the ends of these central tines and to one of the outer tines in any suitable manner. As shown the knife is so positioned on the fork that it will make a "draw-cut" as the cutting edge of said knife is arranged on an incline. The lower end of the knife terminates at the second short tine and said end is arranged at an incline with the cutting edge so that a point 3 is formed at the lowermost part of the cutting edge.

It will be seen that the vines will be cut by the passage of the fork downwardly therethrough so that the cut portions may be easily put into windrows or piles by the tines of the fork. The fork is particularly adapted for handling cow-peas, beans or other vine products.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A pitch fork having a pair of short prongs and a long prong on each side of said pair, and a knife having one end connected with one of the long prongs and its other end connected with one of the short prongs with its central part resting against the other short prong.

In testimony whereof I affix my signature.

JAMES M. JACK.

Copies of this patent may be obtained for five cents each, by addressing the "Commissioner of Patents, Washington, D. C."